United States Patent
Alexandrovichserov et al.

(10) Patent No.: US 8,039,173 B2
(45) Date of Patent: Oct. 18, 2011

(54) CATALYST FOR A FUEL CELL, A METHOD FOR PREPARING THE SAME, A MEMBRANE-ELECTRODE ASSEMBLY FOR A FUEL CELL INCLUDING THE SAME, AND A FUEL CELL SYSTEM INCLUDING THE SAME

(75) Inventors: Alexey Alexandrovichserov, Suwon-si (KR); Chan Kwak, Suwon-si (KR); Myoung-Ki Min, Suwon-si (KR); Si-Hyun Lee, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1102 days.

(21) Appl. No.: 11/798,475

(22) Filed: May 14, 2007

(65) Prior Publication Data

US 2007/0264560 A1    Nov. 15, 2007

(30) Foreign Application Priority Data

May 12, 2006 (KR) .................. 10-2006-0042902

(51) Int. Cl.
*H01M 4/94* (2006.01)
*H01M 4/86* (2006.01)

(52) U.S. Cl. ........ 429/525; 429/526; 502/326; 502/305; 502/313

(58) Field of Classification Search .......... 429/523–527, 429/532; 502/215, 216, 325, 326, 339
See application file for complete search history.

(56) References Cited

U.S. PATENT DOCUMENTS

| | | | |
|---|---|---|---|
| 4,090,978 A * | 5/1978 | Welsh et al. ................ 502/101 |
| 4,591,578 A * | 5/1986 | Foley et al. ................. 502/185 |
| 5,087,534 A * | 2/1992 | Ludwig ......................... 429/11 |
| 5,922,487 A | 7/1999 | Watanabe et al. |
| 6,284,402 B1 | 9/2001 | Mallouk et al. |
| 6,759,024 B2 * | 7/2004 | Takikawa et al. ......... 423/445 B |
| 7,101,639 B2 * | 9/2006 | Gorer et al. .................... 429/524 |
| 7,179,561 B2 * | 2/2007 | Niu et al. ....................... 429/409 |
| 2002/0155342 A1 | 10/2002 | Wainwright et al. |
| 2007/0122685 A1 | 5/2007 | Alexandrovichserov et al. |
| 2007/0212592 A1 | 9/2007 | Alexandrovichserov et al. |

(Continued)

FOREIGN PATENT DOCUMENTS

CA    2269051    4/1998

(Continued)

OTHER PUBLICATIONS

Chinese Office Action dated Oct. 23, 2009 corresponding to Chinese Patent Application No. 200710126670.8.

(Continued)

*Primary Examiner* — Barbara Gilliam
*Assistant Examiner* — Maria J Laios
(74) *Attorney, Agent, or Firm* — Robert E. Bushnell, Esq.

(57) ABSTRACT

A cathode catalyst for a fuel cell includes a carrier and an A-B alloy supported on the carrier, where A is at least one metal selected from the group consisting of Pd, Ir, Rh, and combinations thereof, and B is at least one metal selected from the group consisting of Mo, W, and combinations thereof. The carrier is composed of at least one chalcogen element selected from the group consisting of S, Se, Te, and combinations thereof.

14 Claims, 2 Drawing Sheets

U.S. PATENT DOCUMENTS

| | | |
|---|---|---|
| 2007/0218350 A1 | 9/2007 | Alexandrovichserov et al. |
| 2007/0275290 A1 | 11/2007 | Alexandrovichserov |
| 2008/0090118 A1 | 4/2008 | Gorobinskiy et al. |
| 2008/0152979 A1 | 6/2008 | Alexandrovichserov et al. |

FOREIGN PATENT DOCUMENTS

| | | |
|---|---|---|
| CN | 1553535 | 12/2004 |
| CN | 1610159 A | 4/2005 |
| JP | 2001502467 A | 2/2001 |
| JP | 2003068310 A | 3/2003 |
| JP | 2004-275833 | 10/2004 |
| JP | 2005-105336 | 4/2005 |
| JP | 2005322430 | 11/2005 |
| JP | 2007157711 A | 6/2007 |
| KR | 10-0544886 | 1/2006 |
| KR | 10-0584671 | 5/2006 |

OTHER PUBLICATIONS

Article to C. Fischer, et al., "Electrocatalytic Properties of Mixed Transition Metal Tellurides (Chevrel-Phases) for Oxygen Reduction", Journal of Applied Electrochemistry 25, 1995, pp. 1004-1008.

*Search Report* from the European Patent Office issued in Applicant's corresponding Eropean Patent Application No. 07108182.2 dated Aug. 31, 2007.

Japanese Office Action issued by JPO, dated Feb. 1, 2011, corresponding to Japanese Patent Application No. 2007-128145, together with Request for Entry.

Chinese Letters Patent issued on Dec. 15, 2010 in the corresponding Chinese Patent Application No. 200710126670.8

\* cited by examiner

CATALYST FOR A FUEL CELL, A METHOD FOR PREPARING THE SAME, A MEMBRANE-ELECTRODE ASSEMBLY FOR A FUEL CELL INCLUDING THE SAME, AND A FUEL CELL SYSTEM INCLUDING THE SAME

CROSS-REFERENCE TO RELATED APPLICATION AND CLAIM OF PRIORITY

This application makes reference to, incorporates the same herein, and claims all benefits accruing under 35 U.S.C.§119 from an application for CATHODE CATALYST FOR FUEL CELL, MEMBRANE-ELECTRODE ASSEMBLY FOR FUEL CELL COMPRISING SAME, AND SYSTEM FOR FUEL CELL COMPRISING SAME earlier filed in the Korean Intellectual Property Office on the 12th day of May 2006 and there duly assigned Serial No. 10-2006-0042902.

BACKGROUND OF THE INVENTION (a) Field of the Invention

The present invention relates to a catalyst for a fuel cell, a method of preparing the same, a membrane-electrode assembly for a fuel cell, and a fuel cell system including the same. More particularly, the present invention relates to a cathode catalyst having an improved catalytic activity and selectivity for reduction of an oxidant, and being capable of improving performance of a membrane-electrode assembly for a fuel cell, a method of preparing the same, and a membrane-electrode assembly and a fuel cell system including the same.

(b) Description of the Related Art

A fuel cell is a power generation system for producing electrical energy through an electrochemical redox reaction of an oxidant and hydrogen in a hydrocarbon-based material such as methanol, ethanol, or natural gas.

Such a fuel cell is a clean energy source that can replace fossil fuels. It includes a stack composed of at least one unit cell, and it produces various ranges of power output. Since it has a four to ten times higher energy density than a small lithium battery, it is highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte membrane fuel cell has an advantage of a high energy density and energy conversion efficiency, but it also has problems in the need to carefully handle hydrogen gas and the requirement of additional devices such as a fuel reforming processor for reforming methane or methanol, natural gas, and the like in order to produce hydrogen as the fuel gas.

On the contrary, a direct oxidation fuel cell has a lower energy density than that of the polymer electrolyte membrane fuel cell, but it has the advantages of easy handling of a fuel, being capable of operating at room temperature, and no need for additional fuel reforming processors. Therefore, it has been acknowledged as an appropriate system for a portable power source for small electrical devices.

In the above fuel cells, the stack that generates electricity substantially includes several to scores of unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

A fuel is supplied to the anode and is adsorbed on catalysts of the anode, and the fuel is oxidized to produce protons and electrons. The electrons are transferred into the cathode via an external circuit, and the protons are also transferred into the cathode through the polymer electrolyte membrane. An oxidant is supplied to the cathode, and the oxidant, protons, and electrons are reacted on a catalyst at the cathode to produce electricity along with water.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides a cathode catalyst for a fuel cell having excellent activity and selectivity for reduction of an oxidant. Another embodiment of the present invention provides a membrane-electrode assembly for a fuel cell including the cathode catalyst.

A further embodiment of the present invention provides a fuel cell system including the membrane-electrode assembly for a fuel cell.

According to one embodiment of the present invention, a catalyst for a fuel cell includes a carrier and an A-B alloy, where A is at least one metal selected from the group consisting of Pd, Ir, Rh, and combinations thereof, and B is at least one metal selected from the group consisting of Mo, W, and combinations thereof. The carrier comprises at least one chalcogen element selected from the group consisting of S, Se, Te, and combinations thereof.

The chalcogen element has a nanotube or nanowire shape.

The A-B alloy includes 30 to 60 atom % of the A metal and 40 to 70 atom % of the B metal.

The A-B alloy is supported in an amount of 5 to 75 wt % with respect to total weight of the catalyst.

According to another embodiment of the present invention, a membrane-electrode assembly for a fuel cell including an anode and a cathode facing each other and a polymer electrolyte membrane interposed therebetween is provided. The anode and the cathode include a conductive electrode substrate and a catalyst layer formed thereon. The catalyst layer includes the cathode catalyst prepared according to the present invention.

According to a further embodiment of the present invention, a fuel cell system including an electricity generating element, which includes a membrane-electrode assembly and separators positioned at each side of the membrane-electrode assembly, a fuel supplier that supplies the electricity generating element with a fuel, and an oxidant supplier that supplies the electricity generating element with an oxidant, is provided.

According to another embodiment of the present invention, a catalyst is manufactured by mixing a A metal precursor, a B metal precursor, and a carrier, filtering the mixture, drying the filtered mixture, and heat-treating the dried mixture.

The drying may be performed at 50 to 120° C., and the heat-treatment may be performed at a temperature ranging from 200 to 850° C. for 1 to 5 hours.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
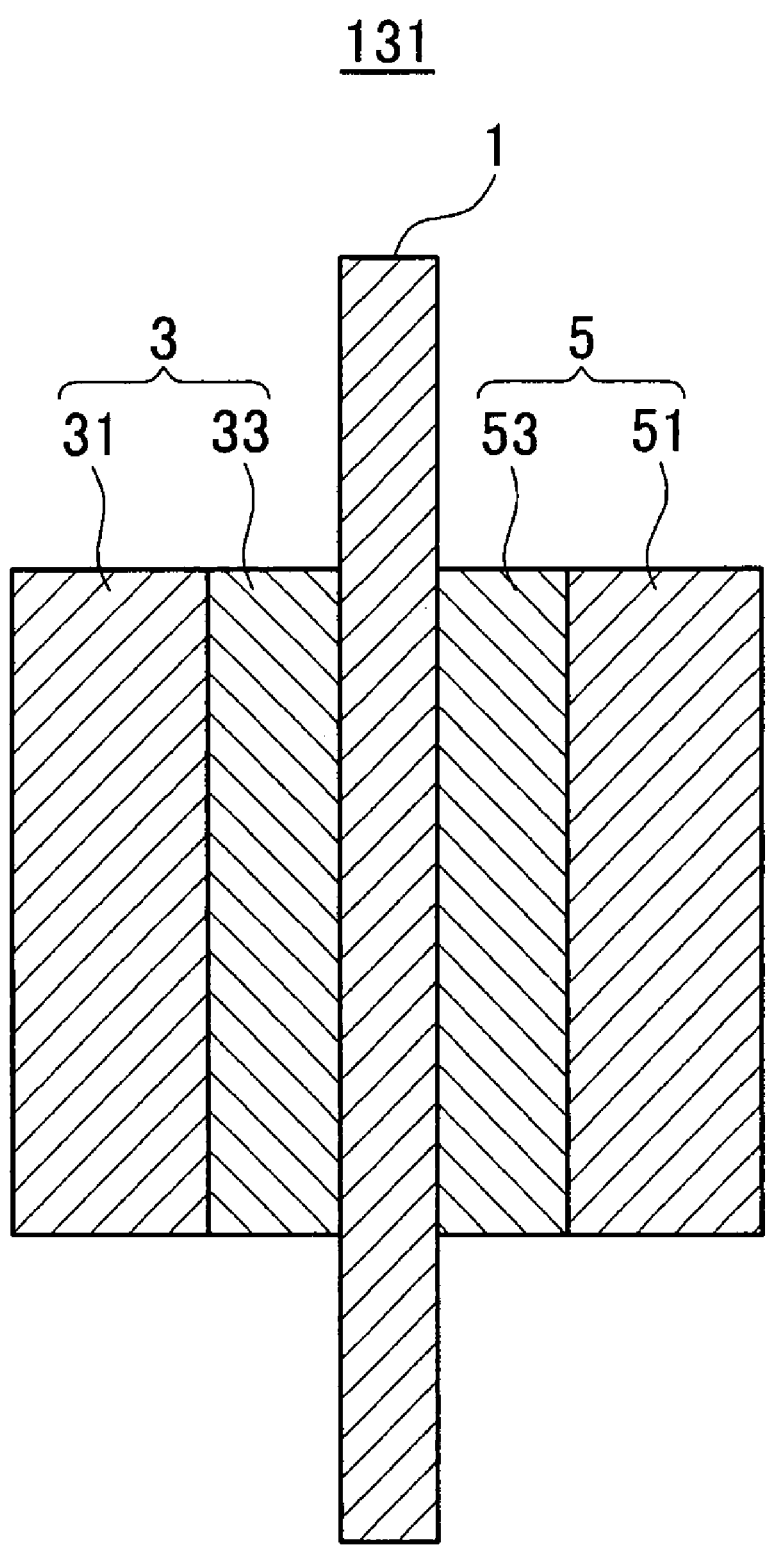
FIG. 1 is a schematic cross-sectional view showing a membrane-electrode assembly according to an embodiment of the present invention.

Exemplary embodiments of the present invention will hereinafter be described in detail with reference to the accompanying drawings.

A fuel cell is a power generation system for generating electrical energy through oxidation of fuel and reduction of an oxidant. The oxidation of the fuel occurs at an anode, while the reduction of the oxidant occurs at a cathode.

The anode includes a catalyst layer that includes a catalyst (also referred to as "anode catalyst") to catalyze the oxidation of fuel. The cathode includes a catalyst layer that includes a catalyst (also referred to as "cathode catalyst") to catalyze the reduction of an oxidant. An example of the catalyst for the anode catalyst layer representatively includes platinum-ruthenium, while an example of the cathode catalyst that for the cathode catalyst layer may include platinum.

However, the platinum as a cathode catalyst has a problem of low selectivity for reduction of an oxidant. It can also be depolarized by a fuel that crosses over toward the cathode through an electrolyte membrane, thereby being inactivated in a direct oxidation fuel cell. Therefore, more attention has been paid to another catalyst that can substitute for the platinum.

According to one embodiment of the present invention, a cathode catalyst having excellent activity and selectivity for an oxidant reduction reaction is provided. The cathode catalyst for a fuel cell according to one embodiment includes a carrier and an A-B alloy, where A is at least one metal selected from the group consisting of Pd, Ir, Rh, and combinations thereof, and B is at least one metal selected from the group consisting of Mo, W, and combinations thereof. The carrier is composed of at least one chalcogen element selected from the group consisting of S, Se, Te, and combinations thereof.

Pd, Ir, and Rh are metals of a platinum group and have high activity for a reduction reaction of an oxidant. The reduction reaction of an oxidant can be more promoted when electrons are provided. Since Mo and W have 6 electrons in the outermost orbit and a large oxidation number, they can play a role of being electron donors to the platinum-based metal and thereby promote reduction of an oxidant when they are alloyed with the platinum-based metal.

Accordingly, when the platinum-based metal is alloyed with Mo or W, it can have higher activity.

In addition, the A-B alloy metals have no particular limit in composition ratio between them, but the A metal may be included in an amount ranging 30 to 60 atom %, and the B metal in an amount ranging 40 to 70 atom %. When the A metal is included in an amount of less than 30 atom %, a catalyst may have less activity and selectivity. However, when included in an amount of more than 60 atom %, a catalyst may have a reduced catalytic activity due to large particle size.

However, since oxygen in the air is easily adsorbed to the alloy, the oxygen in the air adsorbed to the alloy can block the active center of the alloy, resulting in deterioration of reduction of an oxidant.

According to the embodiment of the present invention, this problem can be solved by supporting the alloy on a carrier comprising S, Se, or Te to improve activity of a catalyst. The S, Se, or Te prevents oxygen in the air from being bound with the alloy, playing a role of promoting reduction of an oxidant. They also suppress a fuel oxidation reaction, resulting in improvement of catalyst selectivity. Therefore, a cathode catalyst of the present invention can have high activity and selectivity for reduction reaction of an oxidant.

The bigger the carrier is, the smaller the particles of an active material supported on the carrier can be. The S, Se, and Te may have any conventional carrier shape. In particular, Se and Te can have a nanotube or nanowire shape, which is small and therefore preferable as a carrier. When Te nanotubes are used as a carrier, an active material can have a particle size ranging 6 to 8 nm.

In addition, Te nanotubes can be massively produced and have high electrical conductivity, which is more preferable as a carrier.

Se or Te in a nanotube or nanowire shape has no particular limit in its manufacturing method but may be formed by reacting Se oxide and Te oxide with ethylene glycol at a high temperature and a high pressure.

According to one embodiment of the present invention, Se and Te are prepared into a nanowire shape in an electrodeposition method. First, an aluminum thin film is anodized to prepare an aluminum oxide thin film with micropores. The aluminum oxide thin film is added with a Se or Te salt to a solvent, preparing a solution. Then, Se or Te is electrodeposited on the surface of the aluminum oxide in an electrodeposition method, and thereafter, the aluminum oxide which is a support is removed, preparing a Se or Te nanowire.

The A-B alloy is supported on a carrier of Se or Te in a nanotube or nanowire shape by mixing an A metal precursor, a B metal precursor, and the Se or Te in a nanotube or nanowire shape, and then filtering, drying and heat-treating the mixture. Examples of the A metal precursor include, but are not limited to, palladium acetylacetonate when A is Pd, rhodium acetylacetonate when A is Rh, and iridium acetylacetonate when A is Ir. Examples of the B metal precursor include, but are not limited to, molybdenum carbonyl when B is Mo, and tungsten carbonyl when B is W.

The drying process may be performed at 50 to 120° C. When the drying temperature is lower than 50° C., the mixture may be dried too slowly. When it is higher than 120° C., a catalyst supported on a carrier may be entangled into a chunk.

The heat treatment may be performed at a temperature ranging from 200 to 850° C. for 1 to 5 hours. According to one embodiment, the heat treatment may be performed at a temperature ranging from 225 to 850° C. When the heat treatment is performed at a temperature of lower than 200° C., the precursors may not be completely decomposed. However, when it is performed at a temperature of higher than 850° C., a catalyst supported on a carrier may be entangled into a chunk. Likewise, when the heat treatment is performed for less than 1 hour, a precursor may not be completely decomposed. However, when it is performed for more than 5 hours, a catalyst supported on a carrier may be entangled into a chunk.

The A-B alloy is supported on the carrier in an amount of 5 to 75 wt % based on the entire amount of a catalyst. When a catalyst is supported in an amount of less than 5 wt %, it may have deteriorated activity, while when more than 75 wt %, the catalyst may be entangled into a chunk having deteriorated activity.

The present invention also provides a membrane-electrode assembly for a fuel cell including a cathode catalyst for a fuel cell.

FIG. 1 is a schematic cross-sectional view of a membrane-electrode assembly 131 according to an embodiment of the present invention. Hereinafter, the membrane-electrode assembly 131 of the present invention is described in more detail referring to the drawing.

The membrane-electrode assembly 131 of the embodiment of the present invention includes an anode 3 and a cathode 5 facing each other and a polymer electrolyte membrane 1 interposed therebetween. The anode 3 and the cathode 5 each include an electrode substrate formed of a conductive substrate and a catalyst layer 33, 53 disposed on the electrode substrate.

The membrane-electrode assembly 131 generates electrical energy through oxidation of a fuel and reduction of an oxidant. One or several membrane-electrode assemblies are stacked in a stack.

An oxidant is reduced at a catalyst layer 53 of the cathode 5, which includes the above cathode catalyst. The cathode catalyst has excellent selectivity as well as activity for reduction of an oxidant, and can thereby improve performance of a cathode 5 and a membrane-electrode assembly 131 including the same.

A fuel is oxidized at a catalyst layer 33 of the anode 3, which includes a catalyst that is capable of catalyzing the oxidation of a fuel. The catalyst may be a platinum-based catalyst as is commonly used in the conventional art. The platinum-based catalyst may include platinum, ruthenium, osmium, a platinum-ruthenium alloy, a platinum-osmium alloy, a platinum-palladium alloy, a platinum-M alloy, or combinations thereof, where M is a transition element selected from the group consisting of Ga, Ti, V, Cr, Mn, Fe, Co, Ni, Cu, Zn, Sn, Mo, W, Rh, Ru, and combinations thereof.

The same catalyst may be used for an anode and a cathode as aforementioned, but a platinum-ruthenium alloy catalyst may be used as an anode catalyst in a direct oxidation fuel cell to prevent catalyst poisoning due to CO generated during the anode reaction. Representative examples of the catalysts include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/RuN, Pt/Fe/Co, Pt/Ru/Rh/Ni, Pt/Ru/Sn/W, and combinations thereof.

The anode catalyst may be used in a form of a metal itself (black catalyst) or can be used while being supported on a carrier. The carrier for the anode catalyst may include carbon-based materials such as graphite, denka black, ketjen black, acetylene black, carbon nanotubes, carbon nano fiber, carbon nano wire, carbon nano balls, or activated carbon, or an inorganic particulate such as alumina, silica, zirconia, or titania. Carbon-based materials are generally used in the art.

The catalyst layers 33 and 53 of the anode 3 and the cathode 5 may further include a binder resin to improve its adherence and proton transfer properties. The binder resin may be a proton-conductive polymer. Non-limiting examples of the binder resin include polymer resins having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers.

In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The binder resins may be used singularly or in combination. They may be used along with non-conductive polymers to improve adherence to a polymer electrolyte membrane. The binder resins may be used in a controlled amount to adapt to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The electrode substrates 31 and 51 of the anode and the cathode provide a path for transferring reactants such as fuel and an oxidant to the catalyst layers 33 and 53. In one embodiment, the electrode substrates 31 and 51 are formed from a material such as a carbon paper, a carbon cloth, a carbon felt, or a metal cloth which includes a porous film composed of metal fiber or a metal film disposed on a surface of a cloth composed of polymer fibers. The electrode substrates are not limited thereto.

The electrode substrates 31 and 51 may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL, not shown) can be added between the aforementioned electrode substrates 31 and 51 and the catalyst layer 33 and 53 to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition comprising a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

The polymer electrolyte membrane 1 plays a role of exchanging ions by transferring protons produced at an anode catalyst layer 33 to a cathode catalyst layer 53.

The proton conductive polymer for the polymer electrolyte membrane of the embodiment of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin for the polymer electrolyte membrane of the embodiment of the present invention include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

H can be replaced with Na, K, Li, Cs, or tetrabutylammonium in a proton conductive group of the proton conductive polymer. When the H is substituted by Na in an ion exchange group at the terminal end of the proton conductive group, NaOH is used. When the H is replaced with tetrabutylammonium, tributylammonium hydroxide is used. K, Li, or Cs can also be replaced by using appropriate compounds. Since a method of substituting H is known in this related art, the method is not further described in detail.

According to another embodiment of the present invention, a fuel cell system including the above membrane-electrode assembly is provided. A fuel cell system of an embodiment of the present invention includes at least one electricity generating element, a fuel supplier, and an oxidant supplier. The electricity generating element includes a membrane-electrode assembly that includes a polymer electrolyte membrane and a cathode and an anode positioned at both sides of the polymer electrolyte membrane, and separators positioned at both sides of the membrane-electrode assembly.

The electricity generating element includes a membrane-electrode assembly and separators (bipolar plates). It generates electricity through oxidation of fuel and reduction of an oxidant.

The fuel supplier plays a role of supplying the electricity generating element II with a fuel including hydrogen, and the oxidant supplier plays a role of supplying the electricity generating element with an oxidant. The fuel includes liquid or gaseous hydrogen, or a hydrocarbon-based fuel such as methanol, ethanol, propanol, butanol, or natural gas. The oxidant includes oxygen or air. The fuel and oxidant are not limited to the above.

Figure 2:
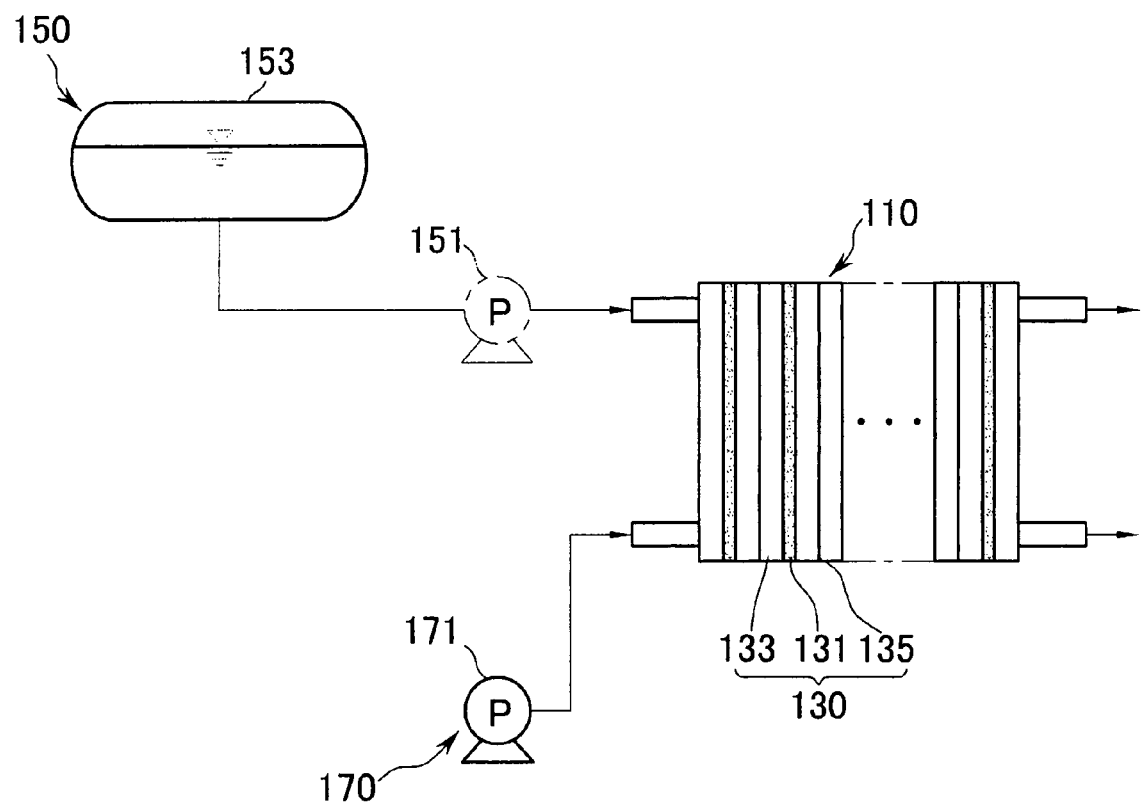
FIG. 2 is schematically shows the structure of a fuel cell system according to another embodiment of the present invention.

FIG. 2 shows a schematic structure of a fuel cell system 100 that will be described in detail with reference to this accompanying drawing, as follows. FIG. 2 illustrates a fuel cell system 100 wherein a fuel and an oxidant are provided to the electricity generating element 130 through pumps 151 and 171, but the present invention is not limited to such structures. The fuel cell system of the present invention alternatively may include a structure wherein a fuel and an oxidant are provided in a diffusion manner.

The fuel cell system 100 includes a stack 110 composed of at least one electricity generating element 130 that generates electrical energy through an electrochemical reaction of fuel and an oxidant, a fuel supplier 150 for supplying the fuel to the electricity generating element 130, and an oxidant supplier 170 for supplying the oxidant to the electricity generating element 130.

In addition, the fuel supplier 150 is equipped with a tank 153 that stores fuel, in addition to a fuel pump 151 that is connected therewith. The fuel pump 151 supplies fuel stored in the tank 153 with a predetermined pumping power.

The oxidant supplier 170, which supplies the electricity generating element 130 of the stack 110 with the oxidant, is equipped with at least one pump 171 for supplying the oxidant with a predetermined pumping power.

The electricity generating element 130 includes a membrane-electrode assembly 131 that oxidizes fuel such as hydrogen and reduces the oxidant, and separators 133 and 135 that are respectively positioned at opposite sides of the membrane-electrode assembly and supply fuel such as hydrogen, and an oxidant, respectively. At least one electricity generating element 130 constitutes a stack.

The following examples illustrate the present invention in more detail. However, it is understood that the present invention is not limited by these examples.

EXAMPLE 1

Preparation of Carrier 1 mmol of $Na_2TeO_3$ was uniformly mixed with 3 mmol of $Na_2SO_3$. The mixture was put in a stainless steel pressure container, which was internally reinforced with TEFLON (polytetrafluoroethylene). Then, the container was filled with distilled water up to 80% of its volume. Then, the stainless steel pressure container was sealed 1 and left at 180° C. for 12 hours, and thereafter cooled to room temperature.

As the above process progressed, a silver-gray solid was formed in the container. The solid was filtered, washed, and dried at 60° C. for 4 hours under a vacuum atmosphere, gaining Te nanotubes.

Preparation of Catalyst 0.5 g of the Te nanotubes was mixed with 1.2 g of palladium acetylacetonate (Pd(acetylacetonate)) and 0.7 g of molybdenum carbonyl (Mo (carbonyl) in 75 ml of water for 24 hours.

The prepared mixture was filtered, dried at 90° C. for 3 hours, and heat-treated at 225° C. for 2 hours, preparing a PdMo alloy catalyst supported on Te nanotubes. The prepared catalyst had a composition ratio of 51 atom % of Pd and 49 atom % of Mo. In addition, the catalyst was supported on Te nanotubes in an amount of 43 wt % based on the entire amount of the catalyst.

Preparation of Electrode

A working electrode was prepared by loading the catalysts according to Example 1 on glassy carbon to be $3.78 \times 10^{-3}$ mg, while a platinum mesh was employed as a counter electrode.

EXAMPLE 2

Preparation of Carrier

Te nanotubes were prepared in the same method as in Example 1.

Preparation of Catalyst 0.5 g of the Te nanotubes, 1.2 g of rhodium acetylacetonate (Rh(acetylacetonate)), and 0.7 g of molybdenum carbonyl (Mo carbonyl) were mixed with 75 ml of water (or ethanol) for 24 hours.

The prepared mixture was filtered, dried at 90° C. for 3 hours, and heat-treated at 225° C. for 2 hours, preparing a RhMo alloy catalyst supported on Te nanotubes. The prepared catalyst had a composition ratio of 43 atom % of Rh and 57 atom % of Mo. In addition, the catalyst was supported on Te nanotubes in an amount of 49 wt % based on the entire amount of the catalyst.

Preparation of Electrode

A working electrode was prepared by loading the catalysts according to Example 2 on glassy carbon to be $3.78 \times 10^{-3}$ mg, while a platinum mesh was employed as a counter electrode.

EXAMPLE 3

Preparation of Carrier 1 mmol of $Na_2SeO_3$ was mixed with 3 mmol of $Na_2SO_3$. The mixture was put in a stainless steel pressure container reinforced with TEFLON (polytetrafluoroethylene). Then, the container was filled with distilled water up to 80% of its volume.

Then, the stainless steel pressure container was sealed and left at 180° C. for 12 hours and then cooled to room temperature.

As the process progressed, a silver-gray solid was formed in the container. The solid was filtered, washed, and dried at 60° C. for 4 hours under a vacuum atmosphere, preparing Se nanotubes.

Preparation of Catalyst 0.5 g of the Se nanotubes, 1.2 g of iridium acetylacetonate (Ir(acetylacetonate)), and 0.7 g of tungsten carbonyl (W carbonyl) were mixed in 75 ml of water (or ethanol) for 24 hours.

The prepared mixture was filtered, dried at 90° C. for 3 hours, and heat-treated at 225° C. for 2 hours, preparing an IrW alloy catalyst supported on Se nanotubes. The prepared catalyst had a composition ratio of 37 atom % of Ir and 63 atom % of W. In addition, the catalyst was supported on the Se nanotubes in an amount of 37 wt % based on the entire amount of the catalyst.

Preparation of Catalyst

A working electrode was prepared by loading the catalysts according to Example 3 on glassy carbon to be $3.78 \times 10^{-3}$ mg, while a platinum mesh was employed as a counter electrode.

COMPARATIVE EXAMPLE 1

Preparation of catalyst 0.6 g of ruthenium carbonyl, 0.03 g of Se, and 1 g of C (carbon) were put in 150 ml of toluene as a solvent and mixed together at 140° C. for 24 hours. The solution was filtered, gaining powder. The powder was dried at 80° C. and heat-treated at 225° C. for 3 hours under a hydrogen atmosphere, preparing a RuSe alloy catalyst supported on ketjen black.

Preparation of Electrode

A working electrode was prepared by loading the catalysts according to Comparative Example 1 on glassy carbon to be $3.78 \times 10^{-3}$ mg, while a platinum mesh was employed as a counter electrode.

Evaluation

An oxygen-saturated sulfuric acid solution was prepared by bubbling oxygen gas for 2 hours in a sulfuric acid solution of a 0.5M concentration. Then, the prepared electrodes were placed into the oxygen-saturated sulfuric acid solution and current density was measured while changing a voltage. The results are provided in the following Table 1.

TABLE 1

| Comparison of a current density of Example 1 and Comparative Example 1 | |
|---|---|
| | Current density (mA/cm$^2$ (0.7 V)) |
| Example 1 | 1.59 |
| Comparative Example 1 | 0.44 |

As shown in Table 1, the catalyst of Example 1 had higher activity than that of Comparative Example 1. In addition, the catalysts of Examples 2 and 3 had higher activity as did those of Example 1 from the result of the current density measurement.

Therefore, a cathode catalyst for a fuel cell of the present invention was found to have excellent activity and selectivity for reduction of an oxidant, improving a membrane-electrode assembly for a fuel cell and a fuel cell system including the catalyst.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for a fuel cell, comprising:
   a carrier comprising at least one chalcogen element selected from the group consisting of S, Se, Te, and combinations thereof; and
   an A-B alloy supported on the carrier, where A metal is at least one metal selected from the group consisting of Pd, Ir, Rh, and combinations thereof, and B metal is at least one metal selected from the group consisting of Mo, W, and combinations thereof, and the amount of the A metal is in the range of 30 to 60 atom% and the amount of the B metal is in the range of 40 to 70 atom% based on the total atoms of the A-B alloy.

2. The catalyst of claim 1, wherein the carrier is at least one chalcogen element selected from the group consisting of Se, Te, and combinations thereof.

3. The catalyst of claim 2, wherein the chalcogen element has a nanotube or nanowire shape.

4. The catalyst of claim 1, wherein the A-B alloy is, supported on the carrier in an amount of 5 to 75 wt% based on the entire amount of the catalyst.

5. A membrane-electrode assembly for a fuel cell, comprising an anode, a cathode facing the anode and comprising the catalyst of claim 1, and a polymer electrolyte membrane interposed between the anode and the cathode.

6. The membrane-electrode assembly of claim 5, wherein the carrier is at least one chalcogen element selected from the group consisting of Se, Te, and combinations thereof.

7. The membrane-electrode assembly of claim 6, wherein the chalcogen element has a nanotube or nanowire shape.

8. The membrane-electrode assembly of claim 5, wherein the A-B alloy is supported on a carrier in an amount of 5 to 75 wt% based on the entire amount of the catalyst.

9. The membrane-electrode assembly of claim 5, wherein the anode comprises a conductive electrode substrate and a catalyst layer on the conductive electrode substrate, the catalyst layer of the anode comprises at least one selected from the group consisting of platinum, ruthenium, osmium, a platinum-ruthenium alloy, a platinum-osmium alloy, a platinum-palladium alloy, a platinum-M alloy, or combinations thereof, where M is a transition element selected from the group consisting of Ga, Ti, V, Cr, Mn, Fe, Co, Ni, Cu, Zn, Sn, Mo, W, Rh, Ru, and combinations thereof.

10. The membrane-electrode assembly of claim 5, wherein the anode and the cathode include the same catalyst.

11. A fuel cell system comprising:
at least one electricity generating element, comprising:
a membrane-electrode assembly, comprising
an anode;
a cathode facing the anode, the cathode comprising a conductive electrode substrate and a catalyst layer on the conductive electrode substrate, the catalyst layer comprising a carrier that comprises at least one chalcogen element selected from the group consisting of S, Se, Te, and combinations thereof, and an A-B alloy supported on the carrier, where A metal is at least one metal selected from the group consisting of Pd, Ir, Rh, and combinations thereof, and B metal is at least one metal selected from the group consisting of Mo, W, and combinations thereof, and the amount of the A metal is in the range of 30 to 60 atom% and the amount of the B metal is in the range of 40 to 70 atom% based on the total atoms of the A-B alloy; and
a polymer electrolyte membrane interposed between the anode and the cathode; and
separators disposed on each side of the membrane-electrode assembly;
a fuel supplier supplying the electricity generating element with a fuel; and
an oxidant supplier supplying the electricity generating element with an oxidant.

12. The fuel cell system of claim 11, wherein the carrier is at least one chalcogen element selected from the group consisting of Se, Te, and combinations thereof.

13. The fuel cell system of claim 12, wherein the chalcogen element has a nanotube or nanowire shape.

14. The fuel cell system of claim 11, wherein the A-B alloy is supported on a carrier in an amount of 5 to 75 wt% based on the entire amount of the catalyst.

* * * * *